(12) United States Patent
Bansal et al.

(10) Patent No.: US 11,225,992 B2
(45) Date of Patent: Jan. 18, 2022

(54) FASTENING SYSTEM AND METHODS FOR USE

(71) Applicant: The Boeing Company, Chicago, IL (US)

(72) Inventors: Amit Bansal, Chicago, IL (US); Chanseyha Eng, Chicago, IL (US)

(73) Assignee: The Boeing Company, Chicago, IL (US)

( * ) Notice: Subject to any disclaimer, the term of this patent is extended or adjusted under 35 U.S.C. 154(b) by 649 days.

(21) Appl. No.: 16/113,415

(22) Filed: Aug. 27, 2018

(65) Prior Publication Data

US 2020/0063782 A1 Feb. 27, 2020

(51) Int. Cl.
| | |
|---|---|
| *F16B 37/12* | (2006.01) |
| *F16B 5/02* | (2006.01) |
| *F16B 11/00* | (2006.01) |
| *B64C 1/18* | (2006.01) |
| *F16B 5/01* | (2006.01) |

(52) U.S. Cl.
CPC .......... *F16B 37/122* (2013.01); *F16B 5/0208* (2013.01); *F16B 11/006* (2013.01); *B64C 1/18* (2013.01); *F16B 5/01* (2013.01); *F16B 37/12* (2013.01); *F16B 2200/503* (2018.08)

(58) Field of Classification Search
CPC .......... F16B 5/01; F16B 5/0208; F16B 5/065; F16B 11/006; F16B 21/06; F16B 21/084; F16B 21/086; F16B 37/00; F16B 37/0842; F16B 37/0857; F16B 37/122; F16B 43/00; F16B 2200/503; F16B 37/12; B64C 1/18; Y10S 411/913

USPC .......... 411/427, 432, 508–510, 511
See application file for complete search history.

(56) References Cited

U.S. PATENT DOCUMENTS

| | | | | |
|---|---|---|---|---|
| 1,978,935 A | * | 10/1934 | Douglas ................ | F16B 37/043 411/80.2 |
| 2,956,605 A | * | 10/1960 | Rapata .................. | F16B 37/043 411/531 |
| 3,019,501 A | * | 2/1962 | Kraus .................... | F16B 5/0208 24/625 |
| 5,007,779 A | * | 4/1991 | Goran ...................... | F16B 5/01 411/41 |
| 5,065,490 A | * | 11/1991 | Wivagg .............. | F16B 19/1081 29/402.17 |
| 6,712,571 B2 | * | 3/2004 | Krohlow ................ | F02M 35/04 411/45 |
| 7,993,085 B2 | | 8/2011 | McClure | |

(Continued)

*Primary Examiner* — Roberta S Delisle
(74) *Attorney, Agent, or Firm* — McDonnell Boehnen Hulbert & Berghoff LLP (57) ABSTRACT

The present disclosure provides an insert of a fastening system. The insert includes (a) a flange, (b) a sidewall extending from the flange and defining a first through-hole, (c) a nut including a first end and a second end and defining a second through-hole, wherein the second end of the nut comprises two or more gripping fingers extending longitudinally from the first end of the nut and separated by two or more slots, and wherein the two or more gripping fingers are flexible in a radial direction and biased to converge inward such that the second through-hole is tapered from the first end of the nut to the second end of the nut, and (d) a stopper coupled to an interior surface of the sidewall and positioned between the first end of the nut and the flange.

25 Claims, 10 Drawing Sheets

(56) References Cited

U.S. PATENT DOCUMENTS

| | | | |
|---|---|---|---|
| 8,075,234 B2* | 12/2011 | McClure | F16B 37/043 |
| | | | 411/71 |
| 10,465,734 B2* | 11/2019 | McClure | F16B 19/1081 |
| 2001/0022924 A1* | 9/2001 | Wieser | F16B 37/122 |
| | | | 411/60.1 |
| 2005/0169726 A1 | 8/2005 | McClure | |
| 2010/0086376 A1* | 4/2010 | McClure | F16B 19/1081 |
| | | | 411/71 |
| 2011/0008124 A1* | 1/2011 | Niklewicz | F16B 13/0833 |
| | | | 411/80.6 |
| 2012/0230796 A1* | 9/2012 | McClure | F16B 5/0258 |
| | | | 411/80.1 |
| 2017/0248163 A1 | 8/2017 | McClure | |

* cited by examiner

FASTENING SYSTEM AND METHODS FOR USE

FIELD

The present disclosure relates generally to fastening systems, and more particularly, to fastening systems and methods of use for fastening a first structure to a second structure, such as fastening floor panels to an airplane structure as a non-limiting example.

BACKGROUND

Aircraft floor panels are generally honeycomb composite or fiberglass panels, typically comprising a composition of two sheets separated by honeycomb core. The floor panel assembly consists of floor panels with a bonded insert hole in the panel. A flange of the bonded insert provides a bearing surface to fasten the panel to the airplane structure.

Conventionally, floor panels in an airplane are mounted to airplane structure by use of clip-nuts or expandable nuts. The clip-nuts have to be attached to all structure attachment holes before the panel can be fastened to the airplane. As such, the use of clip-nuts is not a top down, one step blind fastener installation. Since there are a huge number of fastener attachments required for all floor panels to be attached to airplane structure, installation using clip-nuts takes a large amount of time. While the expandable nuts are a top down fastening system, they have the drawback of a preassembly of screw and nut and design limitations based on nut and insert design and cannot be used for temporary installation. As such, an improved fastening system may be desirable.

SUMMARY

In one aspect, an insert is described. The insert includes (a) a flange including a first surface and a second surface opposite the first surface, (b) a sidewall extending from the first surface of the flange and defining a first through-hole, wherein the sidewall includes a first end and a second end, (c) a nut including a first end and a second end and defining a second through-hole, wherein the first end of the nut is positioned at least partially in the first through-hole such that the first through-hole is coaxial with the second through-hole, wherein the second end of the nut comprises two or more gripping fingers extending longitudinally from the first end of the nut and separated by two or more slots, wherein each of the two or more gripping fingers include a protrusion extending radially outward, and wherein the two or more gripping fingers are flexible in a radial direction and biased to converge inward such that the second through-hole is tapered from the first end of the nut to the second end of the nut, and (d) a first stopper coupled to an interior surface of the sidewall and positioned between the first end of the nut and the second surface of the flange, wherein an outer diameter of the first end of the nut is greater than an inner diameter of the first stopper to prevent the nut from exiting the first through-hole.

In another aspect, a fastening system is described. The system includes an insert comprising: (a) a flange including a first surface and a second surface opposite the first surface, (b) a sidewall extending from the first surface of the flange and defining a first through-hole, wherein the sidewall includes a first end and a second end, (c) a nut having a first end and a second end and defining a second through-hole, wherein the first end of the nut is positioned at least partially in the first through-hole such that the first through-hole is coaxial with the second through-hole, wherein the second end of the nut comprises two or more gripping fingers extending longitudinally from the first end of the nut and separated by two or more slots, wherein each of the two or more gripping fingers include a protrusion extending radially outward, and wherein the two or more gripping fingers are flexible in a radial direction and biased to converge inward, and (d) a first stopper coupled to an interior surface of the sidewall and positioned between the first end of the nut and the second surface of the flange, wherein an outer diameter of the first end of the nut is greater than an inner diameter of the first stopper to prevent the nut from exiting the first through-hole. The system also includes a pin comprising: (a) a head including a first surface and a second surface opposite the first surface, and (b) a shank extending from the second surface of the head, wherein the shank is configured to be positioned at least partially in the second through-hole of the nut.

In yet another aspect, a method for fastening a first structure to a second structure is described. The method includes (a) positioning an insert into a first hole in the first structure, wherein the insert comprises (i) a flange including a first surface and a second surface opposite the first surface, (ii) a sidewall extending from the first surface of the flange and defining a first through-hole, wherein the sidewall includes a first end and a second end, (iii) a nut including a first end and a second end and defining a second through-hole, wherein the first end of the nut is positioned at least partially in the first through-hole such that the first through-hole is coaxial with the second through-hole, wherein the second end of the nut comprises two or more gripping fingers extending longitudinally from the first end of the nut and separated by two or more slots, wherein each of the two or more gripping fingers include a protrusion extending radially outward, and wherein the two or more gripping fingers are flexible in a radial direction and biased to converge inward such that the second through-hole is tapered from the first end of the nut to the second end of the nut, and (iv) a first stopper coupled to an interior surface of the sidewall and positioned between the first end of the nut and the second surface of the flange, wherein an outer diameter of the first end of the nut is greater than an inner diameter of the first stopper to prevent the nut from exiting the first through-hole, (b) positioning the second end of the nut into a second hole in the second structure, wherein the second structure includes a first surface and a second surface opposite the first surface, and (c) inserting a pin into the second through-hole of the nut to transition the nut from a first position in which the second through-hole is tapered from the first end of the nut to the second end of the nut to a second position in which an inner diameter of the second through-hole at the first end of the nut is substantially equal to an inner diameter of the second through-hole at the second end of the nut, wherein the flange is positioned between the first structure and the first surface of the second structure in the second position, and wherein the protrusion of each of the two or more gripping fingers is configured to contact the second surface of the second structure in the second position to thereby secure the first structure to the second structure.

The features, functions, and advantages that have been discussed can be achieved independently in various examples or may be combined in yet other examples further details of which can be seen with reference to the following description and figures.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative examples of the present disclosure when read in conjunction with the accompanying figures.

DETAILED DESCRIPTION

The examples described herein provide a new insert, fastening system including the insert, and corresponding methods of use to fasten a first structure to a second structure. In particular, the fastening system may be used in areas which are inaccessible, such as top down installations. The system described herein may be used to attach a floor panel onto a seat track of an aircraft, attach structural floor panels to an airframe structure, attach cargo panels to an airplane structure, or temporarily attach a doorway support bracket to an airplane structure, among other examples. Other uses are possible as well, including attaching (either permanently or temporarily) any first structure to any second structure. As such, the first structure and second structure may be metallic, composite panels, honeycomb panels, or any other materials.

Accordingly, the system described herein provides an expandable nut and insert assembly that is used to fasten two structural or non-structural plates or elements. While existing designs require a screw that is separate from the nut, the fastening assembly described herein has a nut that is encapsulated into an insert, such that the nut and insert form a single component that is positioned in a through-hole of a first structure. As such, this improved design promotes easier fastener installation and automation. The nut includes two or more gripping fingers that, upon expansion, hold the insert and nut assembly to a second structure. The location of one or more stoppers in the insert provide an operating range for the nut to move up and down, and the rotation of nut in the insert is prevented by the hex or oval shape at the top of nut and insert. The insert could be either screwed, bonded, and/or press fit in the through-hole of the first structure.

Once the insert is positioned in the through-hole of the first structure, a through-hole of the second structure is aligned with a though-hole of the first structure. A pin can then be inserted into a through-hole of the nut, through the through-hole of the first structure and the through-hole of the second structure. Once the pin is inserted into the through-hole of the nut, the two or more gripping fingers go inside the second structure hole and expand to thereby hold the insert and nut assembly to the second structure. In a permanent attachment, the pin is then torqued into threads of the nut to securely fasten the second structure to the first structure. If just a temporary attachment is required, the pin may be non-threaded to enable the pin to be pulled out of the insert assembly after the temporary attachment period.

Various other features of the example systems discussed above, as well as methods for using these systems, are also described hereinafter with reference to the accompanying figures. Illustrative, non-exhaustive examples, which may or may not be claimed, of the subject matter according the present disclosure are provided below.

Figure 1:
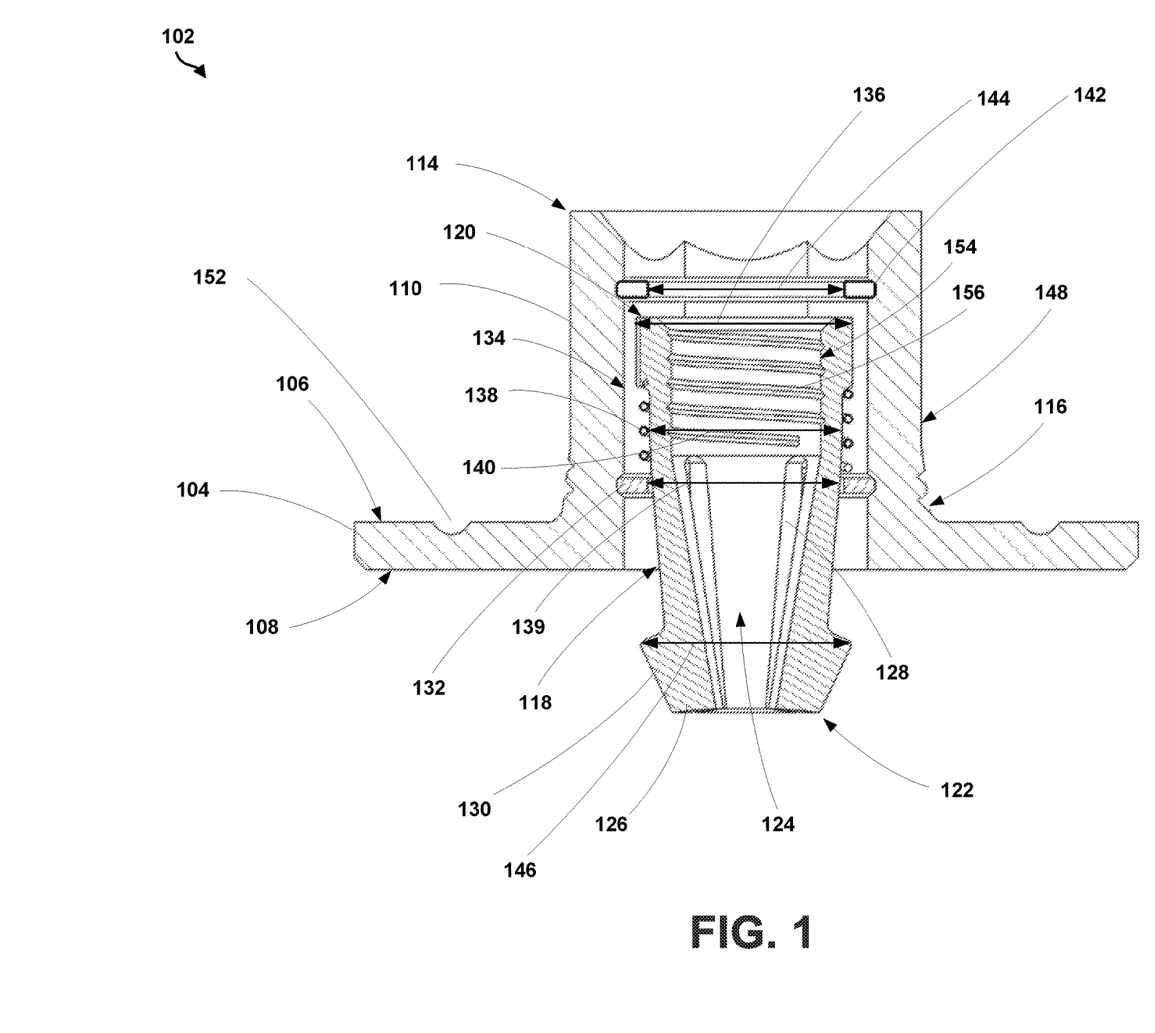
FIG. 1 is a side cross-section view of an insert assembly.

With reference to the Figures, FIG. 1 illustrates an insert assembly 102 including a flange 104 having a first surface 106 and a second surface 108 opposite the first surface 106. The insert 102 also includes a sidewall 110 extending from the first surface 106 of the flange 104 and defining a first through-hole 112. The sidewall 110 includes a first end 114 and a second end 116. The insert 102 also includes a nut 118 including a first end 120 and a second end 122 opposite the first end 120, the nut 118 defining a second through-hole 124. The first end 120 of the nut 118 is positioned at least partially in the first through-hole 112 such that the first through-hole 112 is coaxial with the second through-hole 124. The second end 122 of the nut 118 comprises two or more gripping fingers 126 extending longitudinally from the first end 120 of the nut 118 and separated by two or more slots 128. Each of the two or more gripping fingers 126 include a protrusion 130 extending radially outward. The two or more gripping fingers 126 are flexible in a radial direction and biased to converge inward such that the second through-hole 124 is tapered from the first end 120 of the nut 118 to the second end 122 of the nut 118. The insert 102 also includes a first stopper 132 coupled to an interior surface 134 of the sidewall 110 and positioned between the first end 120 of the nut 118 and the second surface 108 of the flange 104. An outer diameter 136 of the first end 120 of the nut 118 is greater than an inner diameter 139 of the first stopper 132 to prevent the nut 118 from exiting the first through-hole 112.

In one example, the insert 102 can further include a biasing mechanism 138 positioned between the first end 120 of the nut 118 and the first stopper 132. Such a biasing mechanism 138 can comprise a spring, as a non-limiting example. In such an example, the outer diameter 136 of the first end 120 of the nut 118 is greater than an inner diameter 140 of the biasing mechanism 138. The biasing mechanism 138 provides an upward force for the nut 118 to hold to the second structure 182 when used for a temporary fastener without the need of a torqued fastener. In addition, the biasing mechanism 138 provides improved concentric alignment of the nut 118 in the insert 102. The biasing mechanism 138 may further keep the nut 118 in a secure position, which may assist in shipping when assembled panels are stacked.

Figure 2:
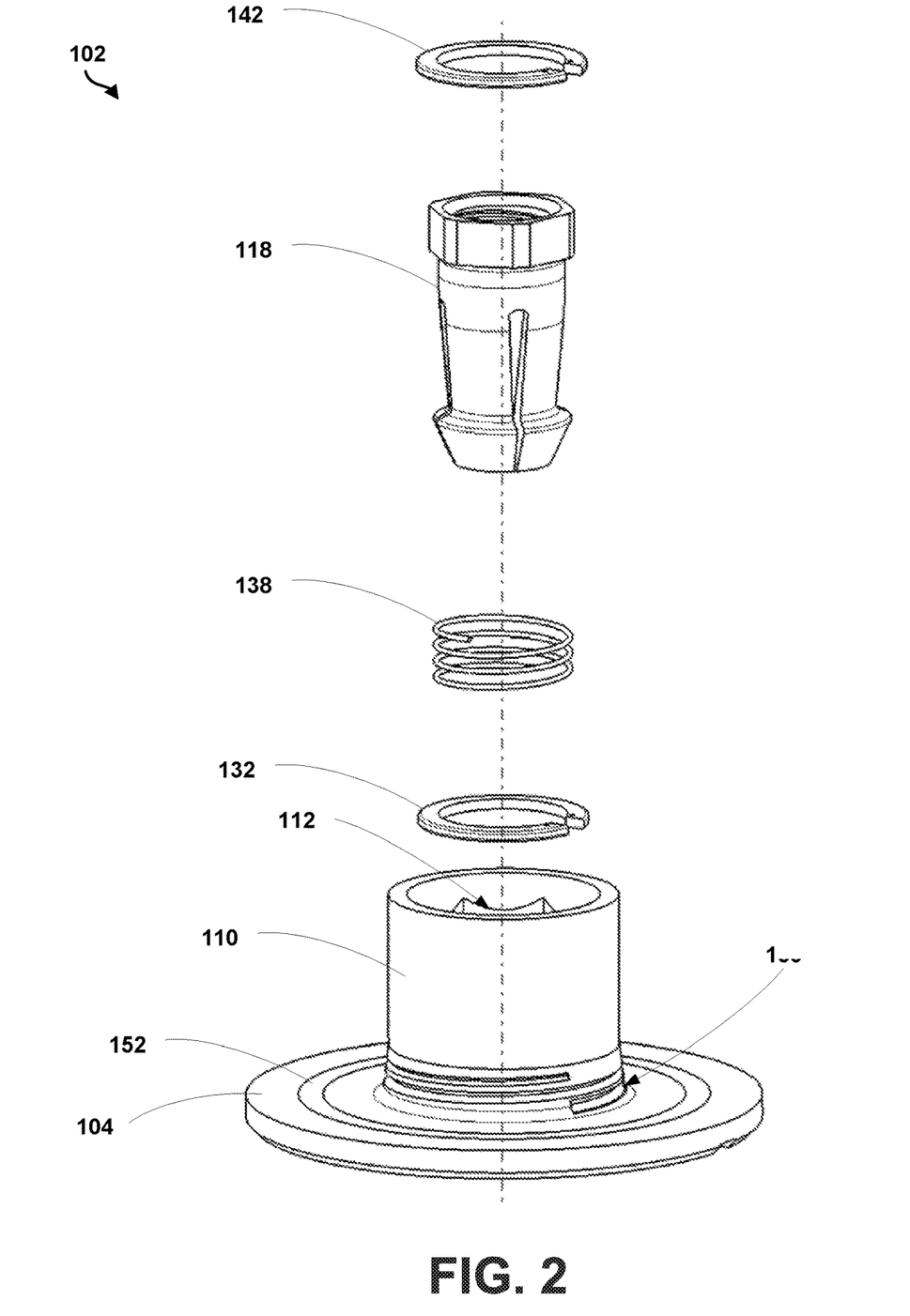
FIG. 2 is an exploded view of the insert assembly shown in FIG. 1.

In another example, as shown in FIG. 2, the insert 102 further includes a second stopper 142 coupled to the interior surface 134 of the sidewall 110 and positioned between the first end 120 of the nut 118 and the first end 114 of the sidewall 110. In such an example, the first stopper 132 and the second stopper 142 defines a range for the nut 118 to move within the insert 102. The outer diameter 136 of the first end 120 of the nut 118 is greater than an inner diameter 139 of the first stopper 132 and an inner diameter 144 of the second stopper 142 to prevent the nut 118 from exiting the first through-hole 112. In one example, an outer diameter 146 of the second end 122 of the nut 118 is greater than the inner diameter 139 of the first stopper 132 to prevent the nut 118 from exiting the first through-hole 112.

As shown in FIG. 1, as one example, a portion of the second end 122 of the nut 118 extends out of the first through-hole 112 past the second surface 108 of the flange 104. Such an arrangement enables the second end 122 of the nut 118 to be inserted into a through-hole of a structure when in use, as discussed in additional detail below.

Figure 3:
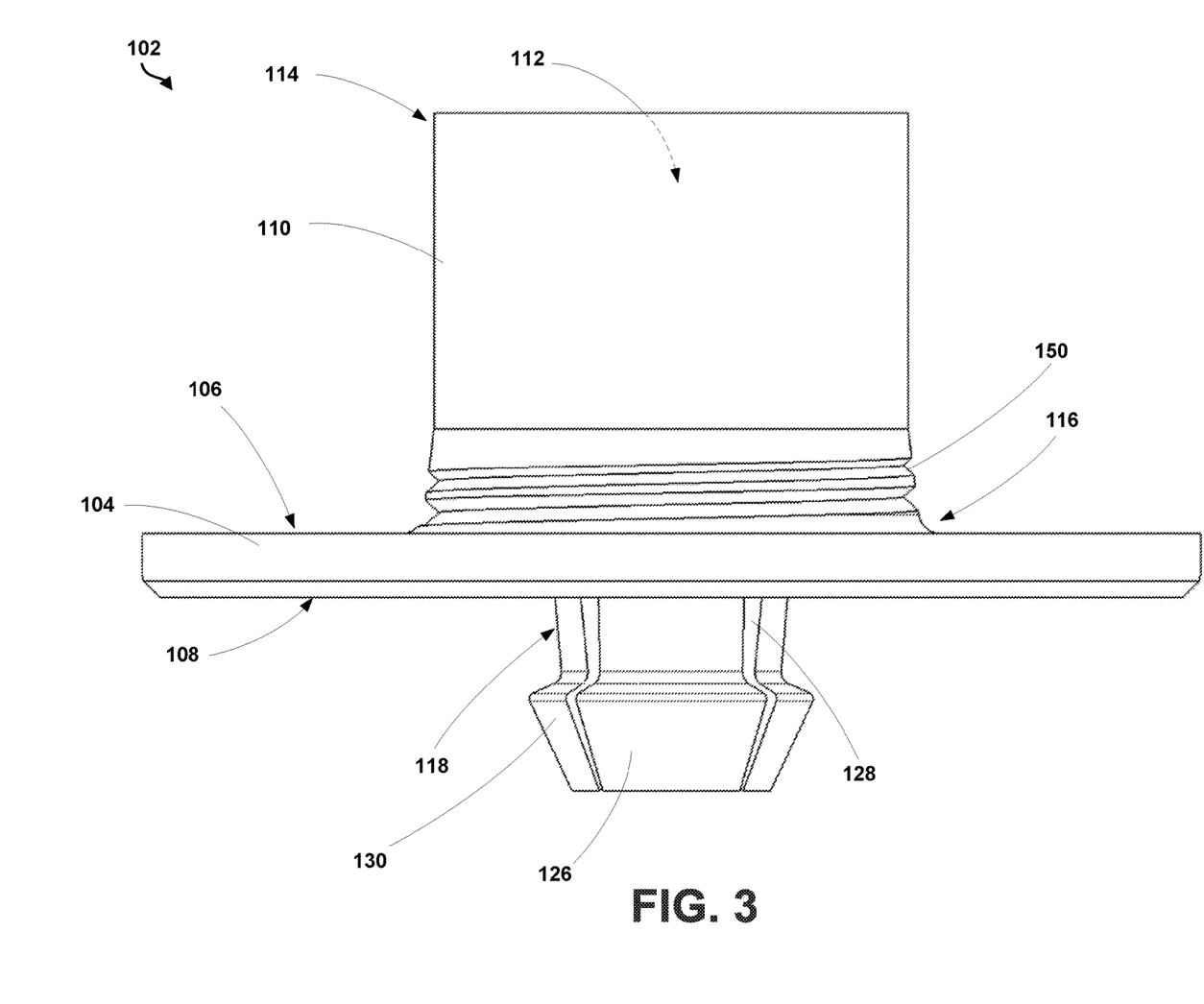
FIG. 3 is a side view of the insert shown in FIG. 1.

As shown in FIG. 3, as one example, an exterior surface 148 of the sidewall 110 is cylindrical. Such an arrangement enables the insert 102 to be positioned into a circular through-hole in a first structure 180 when in use. As shown in FIG. 3, at least a portion of an exterior surface 148 of the sidewall 110 can be threaded 150. The threads 150 on the exterior surface 148 of the sidewall 110 enable the insert 102 to be screwed into a through-hole in a first structure 180 when in use, thereby providing a more secure interface between the insert 102 and the first structure 180. In one particular example, as shown in FIG. 3, the exterior surface 148 of the second end 116 of the sidewall 110 is threaded 150, and the exterior surface 148 of the first end 114 of the sidewall 110 is smooth and not threaded. In another example, the entire exterior surface 148 of the sidewall 110 is threaded 150. In yet another example, the entire exterior surface 148 of the sidewall 110 is smooth, and is press fit into the through-hole of the first structure 180. As shown in FIGS. 1 and 2, the first surface 106 of the flange 104 can include a groove 152. When the insert 102 is used for a permanent assembly, the groove 152 may be configured to receive an adhesive to secure the insert 102 to the first structure 180.

Figure 4A:
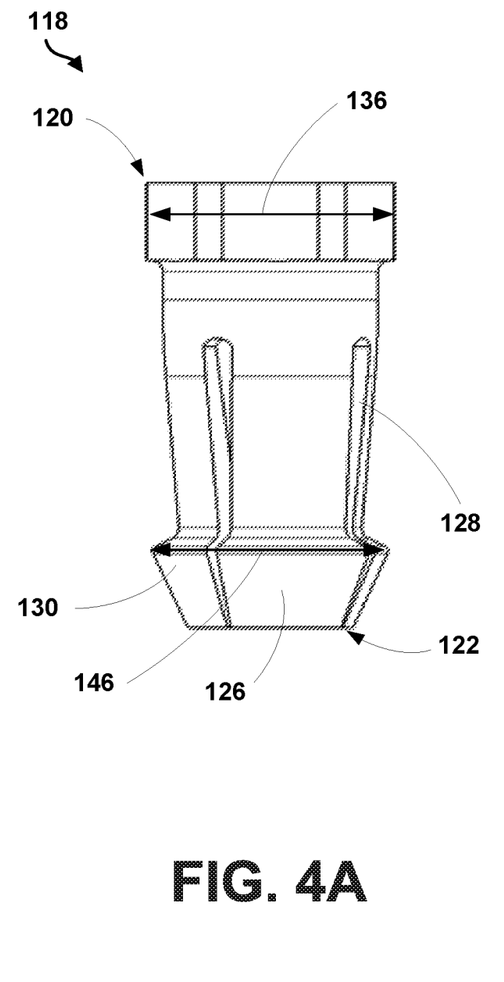
FIG. 4A is a side view of a nut of the insert shown in FIG. 1.
Figure 4B:
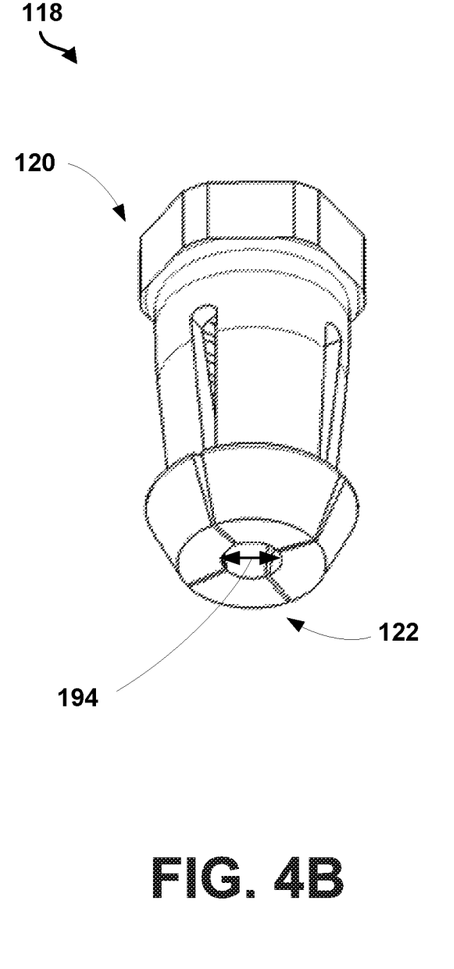
FIG. 4B is a bottom perspective view of the nut of FIG. 4A.
Figure 4C:
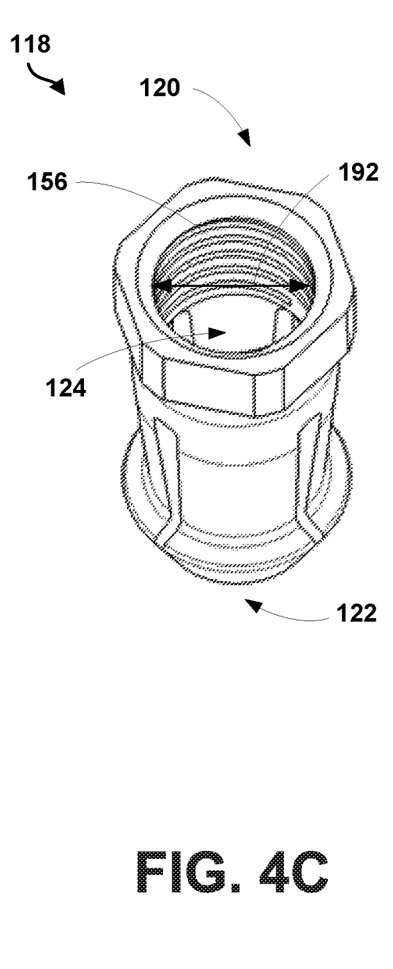
FIG. 4C is a top perspective view of the nut of FIG. 4A.

In one example, as shown in FIG. 4C, an interior surface 154 of the first end 120 of the nut 118 is threaded 156. Such an arrangement provides an interface to receive a threaded pin to torque the nut 118 as discussed in additional detail below.

The shape of the interior surface 134 of the sidewall can be complementary to the shape of the first end 120 of the nut 118, to prevent rotation of the nut 118 within the insert 102. In one particular example, as shown in FIGS. 4A-4C, the interior surface 134 of the sidewall 110 is a hexagonal shape, and the first end 120 of the nut 118 is a complementary hexagonal shape to thereby prevent rotation of the nut 118 with respect to the sidewall 110 of the insert 102. In another example, the interior surface 134 of the sidewall 110 is an oval shape, and the first end 120 of the nut 118 is a complementary oval shape to thereby prevent rotation of the nut 118 with respect to the sidewall 110 of the insert 102. The interior surface 134 of the sidewall 110 and any portion of the nut 118 may be any other shape that prevents rotation of the nut 118 with respect to the sidewall 110 of the insert 102.

In one particular example, as shown in FIGS. 4A-4C, the two or more gripping fingers 126 of the nut 118 comprises four gripping fingers, and the two or more slots 128 comprises four slots separating the four gripping fingers. The four gripping fingers may provide more even load distribution into the insert 102, and can help prevent the gripping fingers 126 from distortion during manufacturing of the nut 118. Other numbers of gripping fingers are possible as well.

Figure 5:
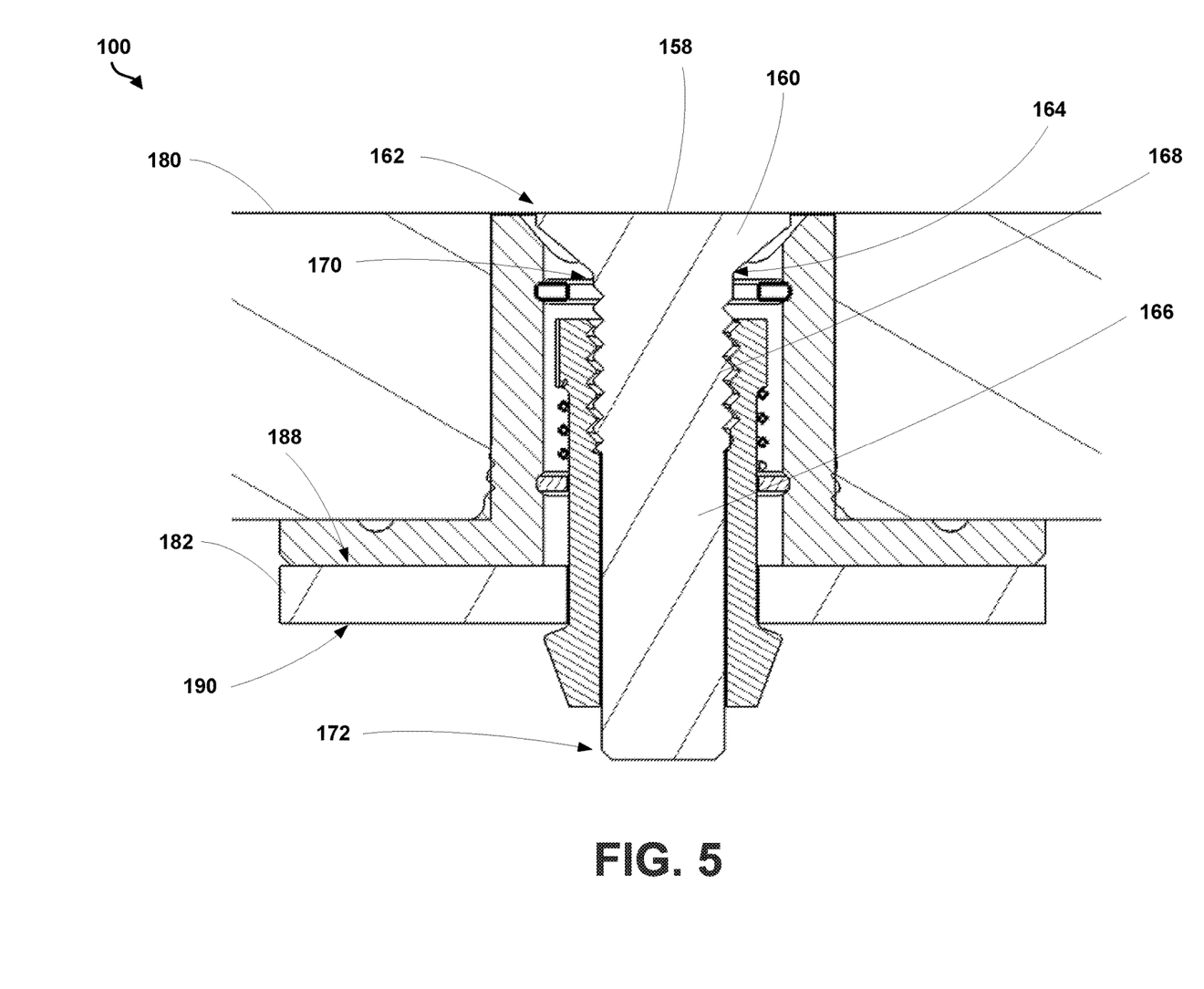
FIG. 5 is a side cross-section view of a fastening assembly.

FIG. 5 illustrates an example fastening system 100. The fastening system 100 includes the insert 102 described above in relation to FIGS. 1-4C. The fastening system 100 also includes a pin 158. The pin 158 includes a head 160 including a first surface 162 and a second surface 164 opposite the first surface 162. The pin 158 also includes a shank 166 extending from the second surface 164 of the head 160. The shank 166 is configured to be positioned at least partially in the second through-hole 124 of the nut 118.

As discussed above, in one example, an interior surface 154 of the first end 120 of the nut 118 is threaded 156. In such an example, at least a portion of the shank 166 includes threads 168 such that when the shank 166 is positioned at least partially in the second through-hole 124 of the nut 118 the threads 156 of the nut 118 interact with the threads 168 of the shank 166. When the threads 168 of the shank 166 engage the threads 156 of the nut 118, the threads 168 slides the nut 118 towards the head 160 of the pin 158, thereby torquing the pin 158.

Figure 6A:
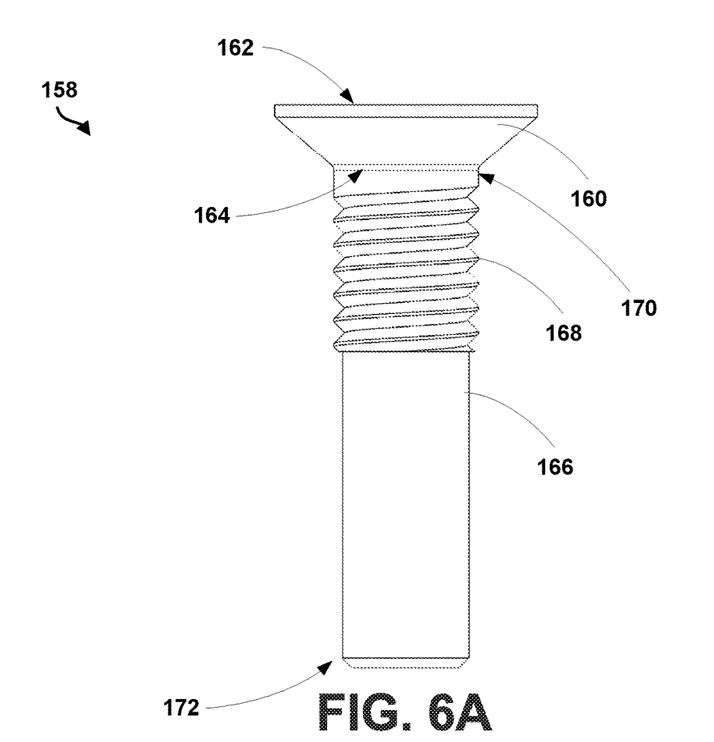
FIG. 6A is a side view of an example pin of the fastening assembly shown in FIG. 5.
Figure 7:
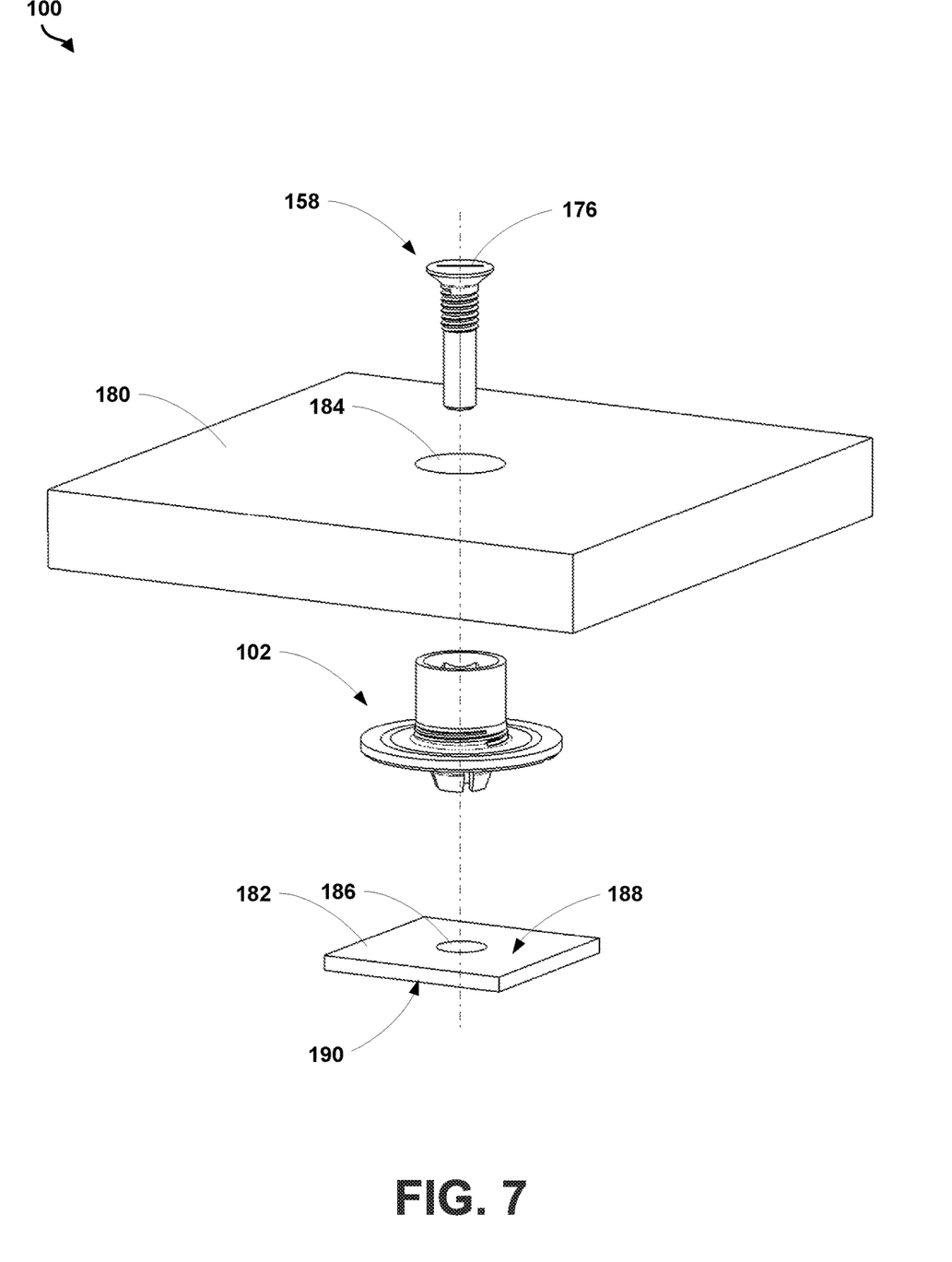
FIG. 7 is an exploded view of the fastening assembly shown in FIG. 5 fastening a first structure to a second structure.

The shank 166 includes a first end 170 positioned adjacent to the head 160 and a second end 172 opposite the first end 170. In one example, as shown in FIG. 6A, the first end of the shank 166 is threaded 168, and the second end 172 of the shank 166 is smooth and not threaded. Such an arrangement can help prevent shavings of screw threads when in contact with the two or more gripping fingers 126 of the nut 118 during expansion of the nut 118, thereby reducing potential foreign object debris during assembly. As shown in FIG. 7, the first surface 162 of the head 160 of the pin 158 can include a drive cutout 176 to enable a user to rotate the pin 158 to torque the pin 158 with respect to the insert 102.

Figure 6B:
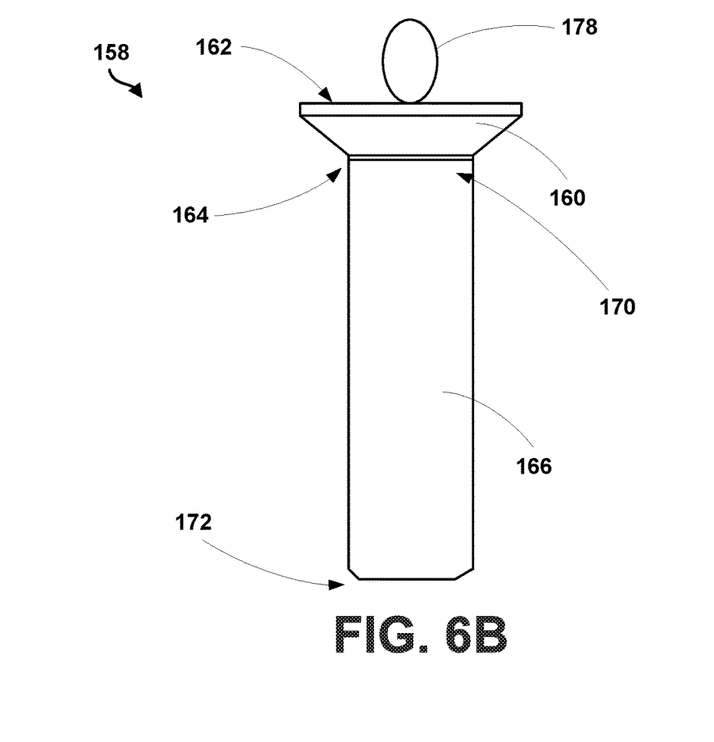
FIG. 6B is a side view of another example pin of the fastening assembly shown in FIG. 5.

In another example, as shown in FIG. 6B, an entire exterior surface of the shank 166 is smooth. Such an arrangement may be preferred for temporary couplings of a first structure 180 to a second structure 182 using the fastening system 100. In such an example, the first surface 162 of the head 160 of the pin 158 is coupled to a screw ring 178 for easy installation and removal of the pin 158 with respect to the nut 118.

FIG. 7 illustrates an exploded view of the fastening system 100 fastening a first structure 180 to a second structure 182. As shown in FIG. 7, the first structure 180 includes a first hole 184, and the second structure 182 includes a second hole 186. The first hole 184 and/or the second hole 186 may be through-holes, or blind holes (e.g., a hole that is recessed in a surface but does not extend through that surface). As described in additional detail below with respect to FIGS. 8A-8C, the insert 102 is positioned in the first hole 184 in the first structure 180. The second hole 186 in the second structure 182 is then placed over the second end 122 of the nut 118. The pin 158 pushes the two or more gripping fingers 126 through the second hole 186 in the second structure 182, and the one or more gripping fingers expand to provide a binding force between the second structure 182 and the insert 102.

Figure 8A:
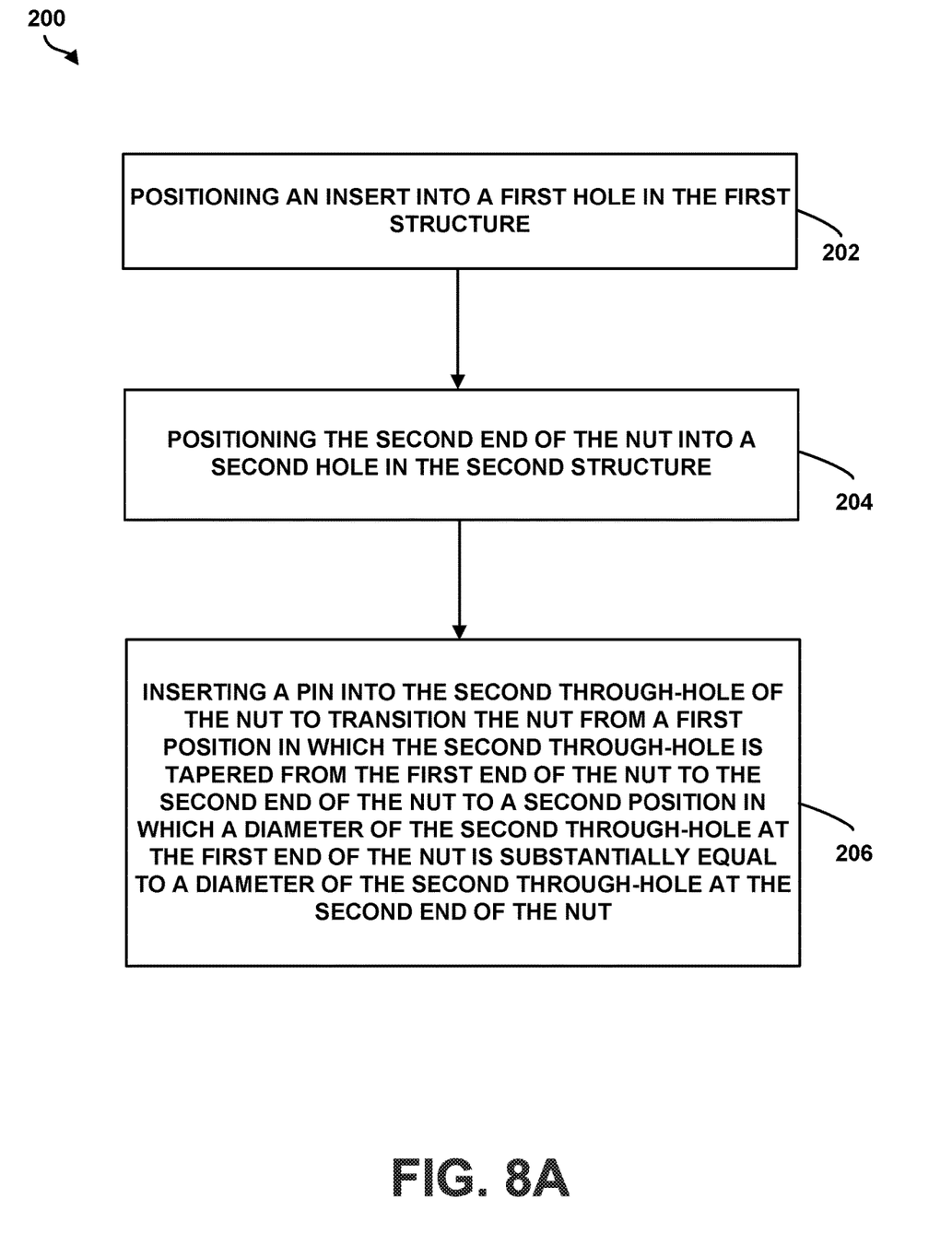
FIG. 8A is a flowchart of an example method for fastening a first structure to a second structure using the fastening system of FIGS. 1 to 7.

FIG. 8A is a block diagram of an example method for fastening a first structure 180 to a second structure 182. Method 200 shown in FIG. 8A presents an example of a method that could be used to assemble the fastening system 100 discussed above in relation to FIGS. 1-7, as an example. Method 200 includes one or more operations, functions, or actions as illustrated by one or more of blocks 202-206. In one example, an aircraft component supplier can manufacture or deliver the insert 102 and/or the pin 158 to an end user such as an aircraft manufacturer. The aircraft manufacturer could then perform the actions recited in blocks 202-206 below. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Initially, at block 202, the method 200 includes positioning an insert 102 into a first hole 184 in the first structure 180. The insert 102 can include any of the features of the insert 102 described above in relation to FIGS. 1-7. At block 204, the method 200 includes positioning the second end 122 of the nut 118 into a second hole 186 in the second structure 182. As shown in FIGS. 5 and 7, the second structure 182 includes a first surface 188 and a second surface 190 opposite the first surface 188.

At block 206, the method 200 includes inserting a pin 158 into the second through-hole 124 of the nut 118 to transition the nut 118 from a first position in which the second through-hole 124 is tapered from the first end 120 of the nut 118 to the second end 122 of the nut 118 to a second position in which an inner diameter 192 of the second through-hole 124 at the first end 120 of the nut 118 is substantially equal to an inner diameter 194 of the second through-hole 124 at the second end 122 of the nut 118. As shown in FIG. 5, the flange 104 is positioned between the first structure 180 and the first surface 188 of the second structure 182 in the second position. Further, as shown in FIG. 5, the protrusion 130 of each of the two or more gripping fingers 126 is configured to contact the second surface 190 of the second structure 182 in the second position to thereby secure the first structure 180 to the second structure 182.

In one example, as discussed above in relation to FIGS. 1-3, at least a portion of an exterior surface 148 of the sidewall 110 includes threads 150. In such an example, the step of positioning the insert 102 into the first hole 184 in the first structure 180 comprises rotating the insert 102 with respect to the first structure 180 such that the threads 150 of the sidewall 110 engage the first hole 184 of the first structure 180.

In another example, as discussed above in relation to FIGS. 1 and 4C, an interior surface 154 of the first end 120 of the nut 118 is threaded 156, and at least a portion of the pin 158 includes complementary threads 168. In such an example, the step of transitioning the nut 118 from the first position to the second position comprises rotating the pin 158 such that the threads 156 of the nut 118 interact with the threads 168 of the pin 158 to push the first end 120 of the nut 118 closer to the flange 104 of the insert 102. As such, when the pin 158 is inserted into the second through-hole 124 of the nut, the pin 158 pushes the nut 118 in a downward direction. This is due to the tapered second through-hole 124 that tapers from the first end 120 of the nut 118 to the second end 122 of the nut 118 in the first position prior to insertion of the pin 158. In one example, as shown in FIG. 5, the step of inserting the pin 158 into the second through-hole 124 of the nut 118 comprises extending the pin 158 past the second end 122 of the nut 118. Such an arrangement ensures that the two or more gripping fingers 126 extend radially outward until the protrusion 130 of each of the two or more gripping fingers 126 is contacts the second surface 190 of the second structure 182 to thereby secure the first structure 180 to the second structure 182.

Figure 8B:
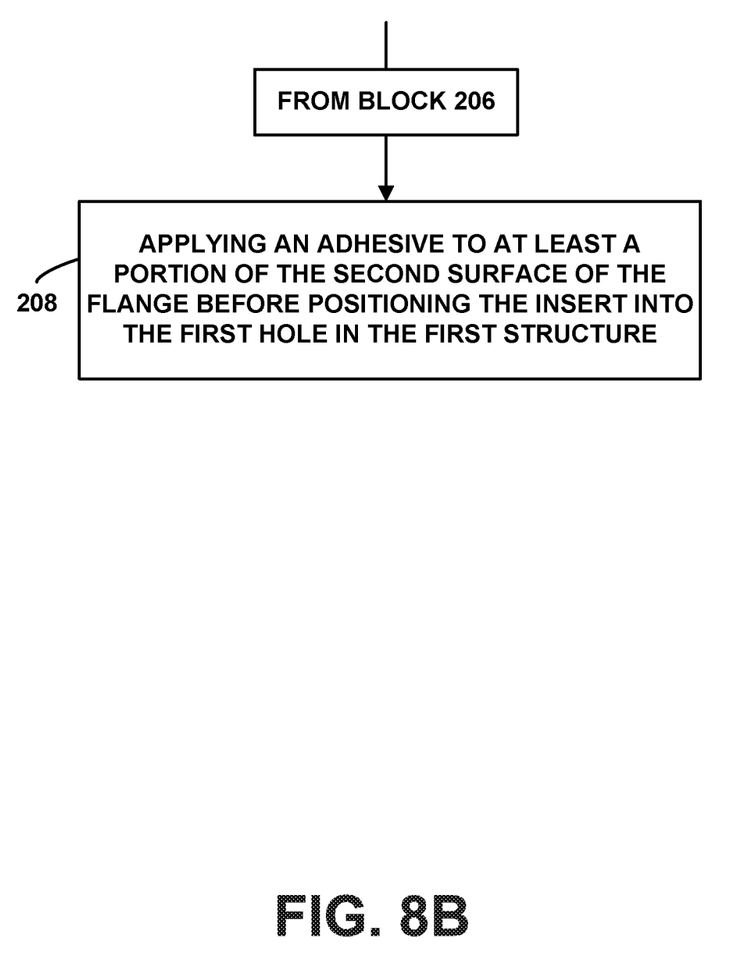
FIG. 8B is a flowchart of a method, which is a continuation of the method for fastening a first structure to a second structure using the fastening system of FIGS. 1 to 7 shown in FIG. 8A.

In one example, as shown in FIG. 8B, at block 208 the method 200 further includes applying an adhesive to at least a portion of the second surface 108 of the flange 104 before positioning the insert 102 into the first hole 184 in the first structure 180. The adhesive may be selected based on the materials of the first structure 180 that will be bonded to the insert 102. In one particular example, the first surface 106 of the flange 104 can include a groove 152 configured to receive the adhesive to secure the insert 102 to the first structure 180. The addition of an adhesive can be used when a permanent attachment of the first structure 180 to the second structure 182 is desired.

Figure 8C:
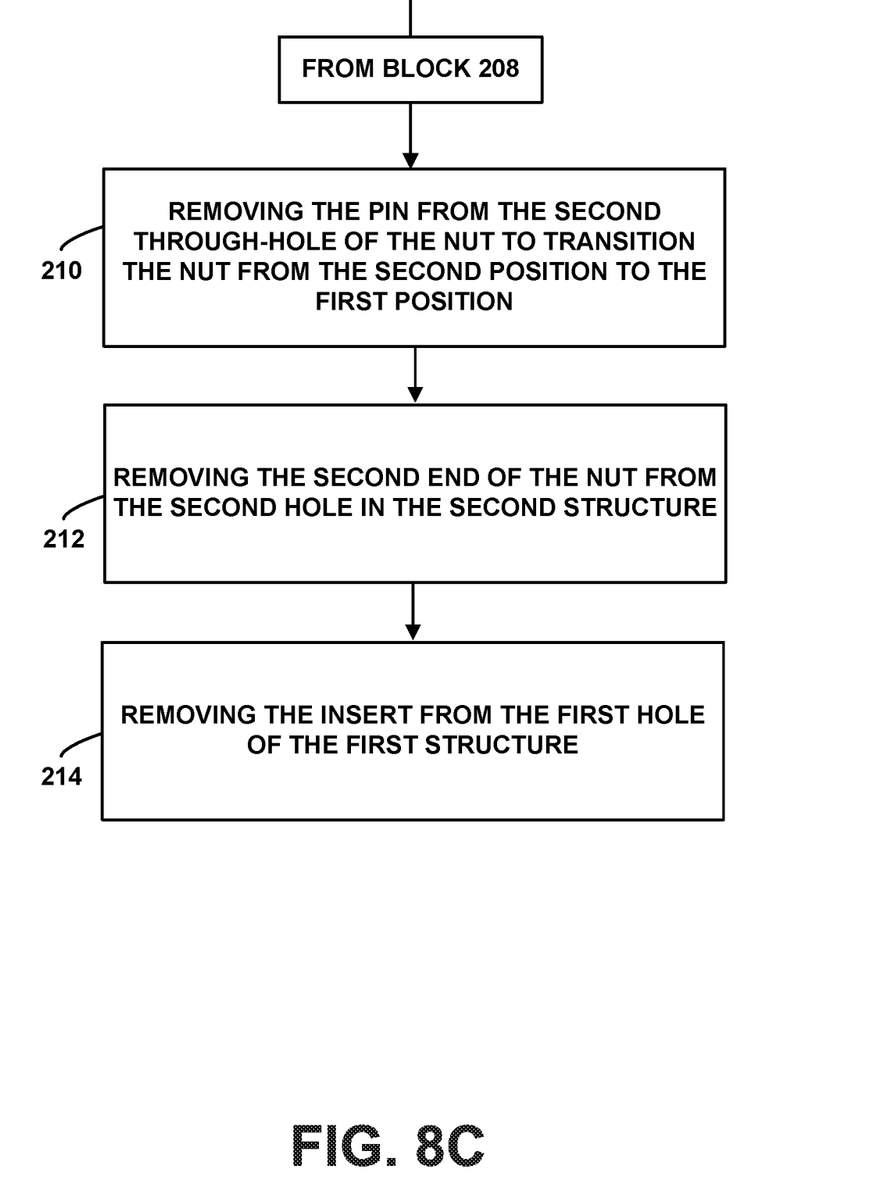
FIG. 8C is a flowchart of a method, which is a continuation of the method for fastening a first structure to a second structure using the fastening system of FIGS. 1 to 7 shown in FIG. 8A.

In another example, as shown in FIG. 8C, at block 210 the method 200 further includes removing the pin 158 from the second through-hole 124 of the nut 118 to transition the nut 118 from the second position to the first position. At block 212, the method 200 further includes removing the second end 122 of the nut 118 from the second hole 186 in the second structure 182. At block 214, the method 200 further includes removing the insert 102 from the first hole 184 of the first structure 180. As such, the fastening system 100 described above can be used for temporary attachment of the first structure 180 to the second structure 182. In such a scenario, as discussed above in relation to FIG. 6B, an entire exterior surface of the shank 166 of the pin 158 may be smooth. In such an example, the first surface 162 of the head 160 of the pin 158 may be coupled to a screw ring 178 for easy installation and removal of the pin 158 with respect to the nut 118.

In the above description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts were described in conjunction with specific examples, it will be understood that these examples are not intended to be limiting.

In FIGS. 8A-8C, referred to above, the blocks may represent operations and/or portions thereof and lines connecting the various blocks do not imply any particular order or dependency of the operations or portions thereof. It will be understood that not all dependencies among the various disclosed operations are necessarily represented. FIGS. 8A-8C and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

As used herein, with respect to measurements, "about" and "substantially" each means +/−5%.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may provide different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. An insert comprising:
   a flange including a first surface and a second surface opposite the first surface;
   a sidewall extending from the first surface of the flange and defining a first through-hole, wherein the sidewall includes a first end and a second end;
   a nut including a first end and a second end and defining a second through-hole, wherein the first end of the nut is positioned at least partially in the first through-hole such that the first through-hole is coaxial with the second through-hole, wherein the second end of the nut comprises two or more gripping fingers extending longitudinally from the first end of the nut and separated by two or more slots, wherein each of the two or more gripping fingers include a protrusion extending radially outward, and wherein the two or more gripping fingers are flexible in a radial direction and biased to converge inward such that the second through-hole is tapered from the first end of the nut to the second end of the nut;
   a first stopper coupled to an interior surface of the sidewall and positioned between the first end of the nut and the second surface of the flange, wherein an outer diameter of the first end of the nut is greater than an inner diameter of the first stopper to prevent the nut from exiting the first through-hole; and
   a spring positioned between the first end of the nut and the first stopper, wherein the outer diameter of the first end of the nut is greater than an inner diameter of the spring.

2. The insert of claim 1, further comprising a second stopper coupled to the interior surface of the sidewall and positioned between the first end of the nut and the first end of the sidewall.

3. The insert of claim 1, wherein the outer diameter of the second end of the nut is greater than the inner diameter of the first stopper to prevent the nut from exiting the first through-hole.

4. The insert of claim 1, wherein at least a portion of the second end of the nut extends out of the first through-hole past the second surface of the flange.

5. The insert of claim 1, wherein the two or more gripping fingers of the nut comprises four gripping fingers, and wherein the two or more slots comprises four slots separating the four gripping fingers.

6. The insert of claim 1, wherein an interior surface of the first end of the nut is threaded.

7. The insert of claim 1, wherein at least a portion of an exterior surface of the sidewall is threaded.

8. The insert of claim 7, wherein the exterior surface of the second end of the sidewall is threaded, and the exterior surface of the first end of the sidewall is not threaded.

9. The insert of claim 1, wherein the first surface of the flange includes a groove configured to receive an adhesive.

10. The insert of claim 1, wherein the interior surface of the sidewall is a hexagonal shape, and wherein the first end of the nut is a complementary hexagonal shape to thereby prevent rotation of the nut with respect to the sidewall.

11. The insert of claim 1, wherein the interior surface of the sidewall is an oval shape, and wherein the first end of the nut is a complementary oval shape to thereby prevent rotation of the nut with respect to the sidewall.

12. A fastening system comprising:
    an insert comprising:
       a flange including a first surface and a second surface opposite the first surface;
       a sidewall extending from the first surface of the flange and defining a first through-hole, wherein the sidewall includes a first end and a second end, wherein at least a portion of an exterior surface of the sidewall is threaded;
       a nut having a first end and a second end and defining a second through-hole, wherein the first end of the nut is positioned at least partially in the first through-hole such that the first through-hole is coaxial with the second through-hole, wherein the second end of the nut comprises two or more gripping fingers extending longitudinally from the first end of the nut and separated by two or more slots, wherein each of the two or more gripping fingers include a protrusion extending radially outward, and wherein the two or more gripping fingers are flexible in a radial direction and biased to converge inward; and
       a first stopper coupled to an interior surface of the sidewall and positioned between the first end of the nut and the second surface of the flange, wherein an outer diameter of the first end of the nut is greater than an inner diameter of the first stopper to prevent the nut from exiting the first through-hole; and
    a pin comprising:
       a head including a first surface and a second surface opposite the first surface; and
       a shank extending from the second surface of the head, wherein the shank is configured to be positioned at least partially in the second through-hole of the nut.

13. The fastening system of claim 12, wherein at least a portion of the second end of the nut extends out of the first through-hole past the second surface of the flange.

14. The fastening system of claim 12, further comprising a spring positioned between the first end of the nut and the first stopper, wherein the outer diameter of the first end of the nut is greater than an inner diameter of the spring.

15. The fastening system of claim 12, further comprising a second stopper coupled to the interior surface of the sidewall and positioned between the first end of the nut and the first end of the sidewall.

16. The fastening system of claim 12, wherein an interior surface of the first end of the nut includes threads, and wherein at least a portion of the shank includes threads such that when the shank is positioned at least partially in the second through-hole of the nut the threads of the nut interact with the threads of the shank.

17. The fastening system of claim 16, wherein the shank includes a first end positioned adjacent to the head and a second end opposite the first end, wherein the first end of the shank is threaded, and wherein the second end of the shank is not threaded.

18. The fastening system of claim 12, wherein the first surface of the head of the pin includes a drive cutout.

19. The fastening system of claim 12, wherein an entire exterior surface of the shank is smooth, and wherein the first surface of the head of the pin is coupled to a screw ring.

20. A method for fastening a first structure to a second structure, the method comprising:
   positioning an insert into a first hole in the first structure, wherein the insert comprises (a) a flange including a first surface and a second surface opposite the first surface, (b) a sidewall extending from the first surface of the flange and defining a first through-hole, wherein the sidewall includes a first end and a second end, (c) a nut including a first end and a second end and defining a second through-hole, wherein the first end of the nut is positioned at least partially in the first through-hole such that the first through-hole is coaxial with the second through-hole, wherein the second end of the nut comprises two or more gripping fingers extending longitudinally from the first end of the nut and separated by two or more slots, wherein each of the two or more gripping fingers include a protrusion extending radially outward, and wherein the two or more gripping fingers are flexible in a radial direction and biased to converge inward such that the second through-hole is tapered from the first end of the nut to the second end of the nut, and (d) a first stopper coupled to an interior surface of the sidewall and positioned between the first end of the nut and the second surface of the flange, wherein an outer diameter of the first end of the nut is greater than an inner diameter of the first stopper to prevent the nut from exiting the first through-hole, wherein at least a portion of an exterior surface of the sidewall includes threads and wherein positioning the insert into the first hole in the first structure comprises rotating the insert with respect to the first structure such that the threads of the sidewall engage the first structure;
   positioning the second end of the nut into a second hole in the second structure, wherein the second structure includes a first surface and a second surface opposite the first surface; and
   inserting a pin into the second through-hole of the nut to transition the nut from a first position in which the second through-hole is tapered from the first end of the nut to the second end of the nut to a second position in which an inner diameter of the second through-hole at the first end of the nut is substantially equal to an inner diameter of the second through-hole at the second end of the nut, wherein the flange is positioned between the first structure and the first surface of the second structure in the second position, and wherein the protrusion of each of the two or more gripping fingers is configured to contact the second surface of the second structure in the second position to thereby secure the first structure to the second structure.

21. The method of claim 20, further comprising applying an adhesive to at least a portion of the second surface of the flange before positioning the insert into the first hole in the first structure.

22. The method of claim 20, further comprising:
   removing the pin from the second through-hole of the nut to transition the nut from the second position to the first position;
   removing the second end of the nut from the second hole in the second structure; and
   removing the insert from the first hole of the first structure.

23. The method of claim 20, wherein an interior surface of the first end of the nut includes threads, wherein at least a portion of the pin includes threads, and wherein transitioning the nut from the first position to the second position comprises rotating the pin such that the threads of the nut interact with the threads of the pin to push the first end of the nut closer to the flange of the insert.

24. The method of claim 20, wherein inserting the pin into the second through-hole of the nut comprises extending the pin past the second end of the nut.

25. An insert comprising:
   a flange including a first surface and a second surface opposite the first surface;
   a sidewall extending from the first surface of the flange and defining a first through-hole, wherein the sidewall includes a first end and a second end;
   a nut including a first end and a second end and defining a second through-hole, wherein the first end of the nut is positioned at least partially in the first through-hole such that the first through-hole is coaxial with the second through-hole, wherein the second end of the nut comprises two or more gripping fingers extending longitudinally from the first end of the nut and separated by two or more slots, wherein each of the two or more gripping fingers include a protrusion extending radially outward, and wherein the two or more gripping fingers are flexible in a radial direction and biased to converge inward such that the second through-hole is tapered from the first end of the nut to the second end of the nut;
   a first stopper coupled to an interior surface of the sidewall and positioned between the first end of the nut and the second surface of the flange, wherein an outer diameter of the first end of the nut is greater than an inner diameter of the first stopper to prevent the nut from exiting the first through-hole; and
   a second stopper coupled to the interior surface of the sidewall and positioned between the first end of the nut and the first end of the sidewall.

* * * * *